US012441002B2

(12) United States Patent
Geating et al.

(10) Patent No.: US 12,441,002 B2
(45) Date of Patent: Oct. 14, 2025

(54) ROBOTIC GRIPPER WITH SEAL DETECTION

(71) Applicant: Boston Dynamics, Inc., Waltham, MA (US)

(72) Inventors: Joshua Timothy Geating, Allston, MA (US); Christopher Everett Thorne, Waltham, MA (US)

(73) Assignee: Boston Dynamics, Inc., Waltham, MA (US)

( * ) Notice: Subject to any disclaimer, the term of this patent is extended or adjusted under 35 U.S.C. 154(b) by 245 days.

(21) Appl. No.: 17/989,337

(22) Filed: Nov. 17, 2022

(65) Prior Publication Data

US 2023/0182318 A1 Jun. 15, 2023

Related U.S. Application Data

(60) Provisional application No. 63/288,360, filed on Dec. 10, 2021.

(51) Int. Cl.
*B25J 13/08* (2006.01)
*B25J 5/00* (2006.01)
(Continued)

(52) U.S. Cl.
CPC ............ *B25J 13/082* (2013.01); *B25J 5/007* (2013.01); *B25J 9/163* (2013.01); *B25J 9/1638* (2013.01); *B25J 15/065* (2013.01)

(58) Field of Classification Search
CPC . B25J 13/082; B25J 5/007; B25J 9/163; B25J 9/1638; B25J 15/065; B25J 9/1612;
(Continued)

(56) References Cited

U.S. PATENT DOCUMENTS 9,205,558 B1 * 12/2015 Zevenbergen ......... B25J 9/1664
10,766,149 B2 * 9/2020 Marchese ............. B25J 9/1669
(Continued)

FOREIGN PATENT DOCUMENTS

EP        3838508 A1    6/2021
WO   2016010968 A1    1/2016

OTHER PUBLICATIONS

International Preliminary Report on Patentability and Written Opinion from the International Bureau for Application No. PCT/US2022/050278, dated Jun. 20, 2024, 8 pages.
(Continued)

*Primary Examiner* — Adam R Mott
*Assistant Examiner* — Sagar Kc
(74) *Attorney, Agent, or Firm* — PEIRCE ATWOOD LLP

(57) ABSTRACT

Some robotic arms may include vacuum-based grippers. Detecting the seal quality between each vacuum assembly of the gripper and a grasped object may enable reactivation of some vacuum assemblies, thereby improving the grasp. One embodiment of a method may include activating each of a plurality of vacuum assemblies of a robotic gripper by supplying a vacuum to each vacuum assembly, determining, for each of the activated vacuum assemblies, a first respective seal quality of the vacuum assembly with a first grasped object, deactivating one or more of the activated vacuum assemblies based, at least in part, on the first respective seal qualities, and reactivating each of the deactivated vacuum assemblies within a reactivation interval.

20 Claims, 10 Drawing Sheets

(51) Int. Cl.
*B25J 9/16* (2006.01)
*B25J 15/06* (2006.01)

(58) Field of Classification Search
CPC .............. B25J 15/0052; B25J 15/0625; G05B 2219/37399; G05B 2219/39558
See application file for complete search history.

(56) References Cited

U.S. PATENT DOCUMENTS

| | | | | |
|---|---|---|---|---|
| 11,712,801 | B2* | 8/2023 | Hane | G06N 3/08 700/253 |
| 2005/0021177 | A1* | 1/2005 | Bacchi | B25J 9/1692 700/245 |
| 2006/0182607 | A1* | 8/2006 | Clark | B65G 61/00 414/744.5 |
| 2015/0017025 | A1* | 1/2015 | Holecek | B25J 19/02 417/54 |
| 2018/0136631 | A1* | 5/2018 | Takahashi | B25J 9/163 |
| 2018/0250820 | A1* | 9/2018 | Shimodaira | B25J 9/1697 |
| 2019/0126473 | A1* | 5/2019 | Sato | B25J 13/081 |
| 2020/0109712 | A1* | 4/2020 | Maishigi | F04C 28/28 |
| 2020/0164506 | A1* | 5/2020 | Hallock | B25J 9/1612 |
| 2020/0269429 | A1* | 8/2020 | Chavez | B25J 19/023 |
| 2020/0290214 | A1* | 9/2020 | Watanabe | B25J 9/1674 |
| 2021/0122046 | A1* | 4/2021 | Sun | B25J 9/1674 |
| 2022/0212884 | A1* | 7/2022 | Doi | B25J 9/1612 |

OTHER PUBLICATIONS

International Search Report and Written Opinion of the International Searching Authority for International Application No. PCT/US2022/050278, dated Mar. 29, 2023.

* cited by examiner

ROBOTIC GRIPPER WITH SEAL DETECTION

CROSS REFERENCE TO RELATED APPLICATIONS

This application claims the benefit under 35 U.S.C. § 119(e) of U.S. Provisional application Ser. No. 63/288,360, filed Dec. 10, 2021, and entitled, "ROBOTIC GRIPPER WITH SEAL DETECTION," the disclosure of which is incorporated by reference in its entirety.

BACKGROUND

A robot is generally defined as a reprogrammable and multifunctional manipulator designed to move material, parts, tools, or specialized devices through variable programmed motions for a performance of tasks. Robots may be manipulators that are physically anchored (e.g., industrial robotic arms), mobile robots that move throughout an environment (e.g., using legs, wheels, or traction-based mechanisms), or some combination of a manipulator and a mobile robot. Robots are utilized in a variety of industries including, for example, manufacturing, warehouse logistics, transportation, hazardous environments, exploration, and healthcare.

SUMMARY

During robotic pick-and-place tasks in logistics scenarios (e.g., depalletizing, truck unloading, order building, etc.), a firm grasp of the object being manipulated is often desirable. For a robotic manipulator with a vacuum-based gripper, grasp quality may be related to the number of vacuum assemblies of the gripper that are able to form a good seal with the object being manipulated. A high-quality grasp may be enabled by engaging a large number of vacuum assemblies with the object at certain times and/or deactivating vacuum assemblies that fail to make a good seal with the object at certain times. In some scenarios, a vacuum assembly may initially fail to make a good seal with the object and may be deactivated, but may later be capable of making a good seal (or better seal) if it were activated (e.g., due to changing conditions during a grasp). In some embodiments, the methods described herein include alternatingly activating and deactivating vacuum assemblies of a vacuum-based robotic gripper to increase the number of vacuum assemblies that form a good seal with an object, thereby increasing the overall quality of the grasp.

One aspect of the disclosure provides a method. The method comprises activating each of a plurality of vacuum assemblies of a robotic gripper by supplying a vacuum to each vacuum assembly; determining, for each of the activated vacuum assemblies, a first respective seal quality of the vacuum assembly with a first grasped object; deactivating one or more of the activated vacuum assemblies based, at least in part, on the first respective seal qualities; and reactivating each of the deactivated vacuum assemblies within a reactivation interval.

In another aspect, the method further comprises determining, for each of the reactivated vacuum assemblies, a second respective seal quality of the vacuum assembly; and deactivating one or more of the reactivated vacuum assemblies based, at least in part, on the second respective seal qualities.

In another aspect, determining, for each of the activated vacuum assemblies, a first respective seal quality of the vacuum assembly comprises sensing, for each of the activated vacuum assemblies, a first respective pressure level of the vacuum assembly.

In another aspect, deactivating one or more of the activated vacuum assemblies based, at least in part, on the first respective seal qualities comprises deactivating one or more of the activated vacuum assemblies when the first sensed pressure levels are below a threshold level.

In another aspect, the threshold level is greater than or equal to 20% of a vacuum source pressure and less than or equal to 99% of the vacuum source pressure.

In another aspect, the threshold level is greater than or equal to 60% of the vacuum source pressure and less than or equal to 98% of the vacuum source pressure.

In another aspect, the reactivation interval is greater than or equal to 5 milliseconds and less than or equal to 5000 milliseconds.

In another aspect, the reactivation interval is greater than or equal to 50 milliseconds and less than or equal to 1000 milliseconds.

In another aspect, the reactivation interval is greater than or equal to 100 milliseconds and less than or equal to 500 milliseconds.

In another aspect, the method further comprises repeatedly performing the determining, the deactivating, and the reactivating until a stop criterion is satisfied.

In another aspect, the stop criterion comprises a number of deactivated cups being below a threshold number of cups.

In another aspect, the stop criterion comprises reaching a threshold number of deactivation/reactivation cycles.

In another aspect, the stop criterion comprises exceeding a threshold time limit.

In another aspect, the stop criterion is based, at least in part, on an output of a model associated with an interaction between the robotic gripper and the first grasped object.

In another aspect, activating each of the plurality of vacuum assemblies of the robotic gripper comprises supplying a pulse of vacuum to each vacuum assembly, determining, for each of the activated vacuum assemblies, a first respective seal quality of the vacuum assembly with a first grasped object comprises determining an amplitude of a pressure signal inside a respective activated vacuum assembly in response to application of the pulse of vacuum, and deactivating one or more of the activated vacuum assemblies based, at least in part, on the first respective seal qualities comprises deactivating one or more of the activated vacuum assemblies when the respective amplitude of the pressure signal inside the respective activated vacuum assembly is below a threshold level.

In another aspect, activating each of the plurality of vacuum assemblies of the robotic gripper comprises supplying a steady state vacuum to each vacuum assembly, determining, for each of the activated vacuum assemblies, a first respective seal quality of the vacuum assembly with a first grasped object comprises determining a steady state pressure signal inside a respective activated vacuum assembly after the steady state vacuum has been supplied to the respective activated vacuum assembly for a particular amount of time, and deactivating one or more of the activated vacuum assemblies based, at least in part, on the first respective seal qualities comprises deactivating a respective activated vacuum assembly when the respective steady state pressure inside the respective activated vacuum assembly is below a threshold level.

One aspect of the disclosure provides a mobile robotic device. The mobile robotic device comprises a robotic gripper and at least one computer processor. The mobile gripper comprises a plurality of vacuum assemblies and at least one pressure sensor associated with each vacuum assembly of the plurality of vacuum assemblies. The at least one computer processor is programmed to activate each vacuum assembly supplying a vacuum to each vacuum assembly; determine, for each of the activated vacuum assemblies, a first respective seal quality of the vacuum assembly with a first grasped object; deactivate one or more of the activated vacuum assemblies based, at least in part, on the first respective seal qualities; and reactivate each of the deactivated vacuum assemblies within a reactivation interval.

In another aspect, the at least one computer processor is programmed to determine, for each of the activated vacuum assemblies, a first respective seal quality of the vacuum assembly using a first respective pressure level of the vacuum assembly from a respective pressure sensor of the robotic gripper.

One aspect of the disclosure provides a method of grasping an object. The method comprises activating a plurality of vacuum assemblies of a robotic gripper; sealing at least one of the activated vacuum assemblies with a surface of the object, thereby deforming the surface; deactivating one or more of the activated vacuum assemblies; reactivating each of the deactivated vacuum assemblies; and sealing at least one of the reactivated vacuum assemblies with the deformed surface of the object.

In another aspect, deactivating one or more of the activated vacuum assemblies comprises deactivating one or more of the activated vacuum assemblies based, at least in part, on a determined seal quality of the activated vacuum assemblies.

In another aspect, the determined seal quality of the activated vacuum assemblies is based, at least in part on a pressure level of the vacuum assembly.

In another aspect, the reactivation interval is greater than or equal to 5 milliseconds and less than or equal to 5000 milliseconds.

In another aspect, the reactivation interval is greater than or equal to 50 milliseconds and less than or equal to 1000 milliseconds.

In another aspect, the reactivation interval is greater than or equal to 100 milliseconds and less than or equal to 500 milliseconds.

In another aspect, sealing the at least one of the activated vacuum assemblies with the surface of the object deforms the surface.

In another aspect, sealing the at least one of the activated vacuum assemblies with the surface of the object displaces the object.

In another aspect, the method further comprises repositioning the robotic gripper relative to the object prior to reactivating each of the deactivated vacuum assemblies.

In another aspect, the method further comprises repeatedly performing the determining, the deactivating, and the reactivating until a stop criterion is satisfied.

In another aspect, the stop criterion comprises a number of deactivated cups being below a threshold number of cups.

In another aspect, the stop criterion comprises reaching a threshold number of deactivation/reactivation cycles.

In another aspect, the stop criterion comprises exceeding a threshold time limit.

In another aspect, the stop criterion is based, at least in part, on an output of a model associated with an interaction between the robotic gripper and the first grasped object.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
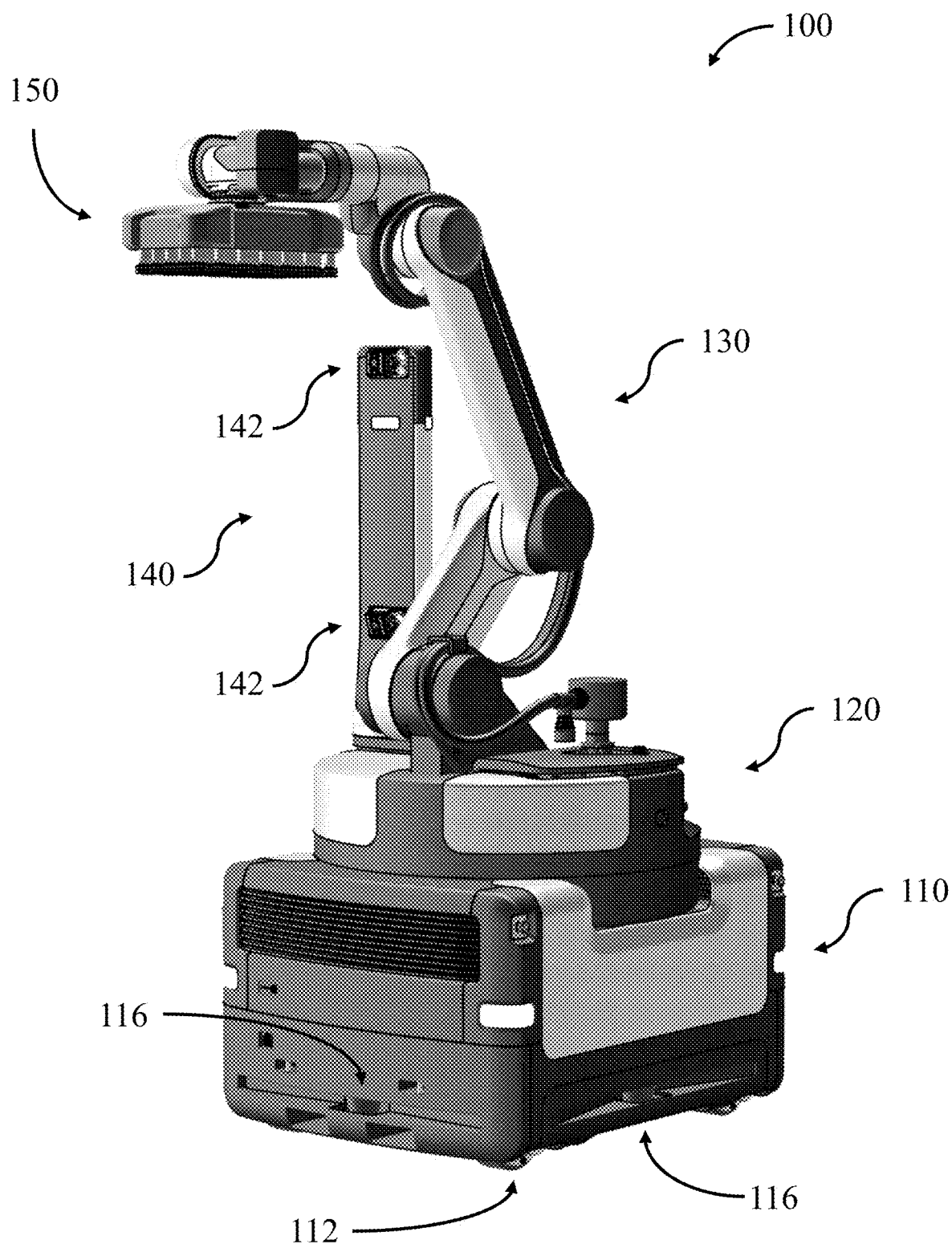
FIG. 1A is a perspective view of one embodiment of a robot.

Robots are typically configured to perform various tasks in an environment in which they are placed. Generally, these tasks include interacting with objects and/or the elements of the environment. Notably, robots are becoming popular in warehouse and logistics operations. Before the introduction of robots to such spaces, many operations were performed manually. For example, a person might manually unload boxes from a truck onto one end of a conveyor belt, and a second person at the opposite end of the conveyor belt might organize those boxes onto a pallet. The pallet may then be picked up by a forklift operated by a third person, who might drive to a storage area of the warehouse and drop the pallet for a fourth person to remove the individual boxes from the pallet and place them on shelves in the storage area. More recently, robotic solutions have been developed to automate many of these functions. Such robots may either be specialist robots (i.e., designed to perform a single task, or a small number of closely related tasks) or generalist robots (i.e., designed to perform a wide variety of tasks). To date, both specialist and generalist warehouse robots have been associated with significant limitations, as explained below.

A specialist robot may be designed to perform a single task, such as unloading boxes from a truck onto a conveyor belt. While such specialist robots may be efficient at performing their designated task, they may be unable to perform other, tangentially related tasks in any capacity. As such, either a person or a separate robot (e.g., another specialist robot designed for a different task) may be needed to perform the next task(s) in the sequence. As such, a warehouse may need to invest in multiple specialist robots to perform a sequence of tasks, or may need to rely on a hybrid operation in which there are frequent robot-to-human or human-to-robot handoffs of objects.

In contrast, a generalist robot may be designed to perform a wide variety of tasks, and may be able to take a box through a large portion of the box's life cycle from the truck to the shelf (e.g., unloading, palletizing, transporting, depalletizing, storing). While such generalist robots may perform a variety of tasks, they may be unable to perform individual tasks with high enough efficiency or accuracy to warrant introduction into a highly streamlined warehouse operation. For example, while mounting an off-the-shelf robotic manipulator onto an off-the-shelf mobile robot might yield a system that could, in theory, accomplish many warehouse tasks, such a loosely integrated system may be incapable of performing complex or dynamic motions that require coordination between the manipulator and the mobile base, resulting in a combined system that is inefficient and inflexible. Typical operation of such a system within a warehouse environment may include the mobile base and the manipulator operating sequentially and (partially or entirely) independently of each other. For example, the mobile base may first drive toward a stack of boxes with the manipulator powered down. Upon reaching the stack of boxes, the mobile base may come to a stop, and the manipulator may power up and begin manipulating the boxes as the base remains stationary. After the manipulation task is completed, the manipulator may again power down, and the mobile base may drive to another destination to perform the next task. As should be appreciated from the foregoing, the mobile base and the manipulator in such systems are effectively two separate robots that have been joined together; accordingly, a controller associated with the manipulator may not be configured to share information with, pass commands to, or receive commands from a separate controller associated with the mobile base. As such, such a poorly integrated mobile manipulator robot may be forced to operate both its manipulator and its base at suboptimal speeds or through suboptimal trajectories, as the two separate controllers struggle to work together. Additionally, while there are limitations that arise from a purely engineering perspective, there are additional limitations that must be imposed to comply with safety regulations. For instance, if a safety regulation requires that a mobile manipulator must be able to be completely shut down within a certain period of time when a human enters a region within a certain distance of the robot, a loosely integrated mobile manipulator robot may not be able to act sufficiently quickly to ensure that both the manipulator and the mobile base (individually and in aggregate) do not a pose a threat to the human. To ensure that such loosely integrated systems operate within required safety constraints, such systems are forced to operate at even slower speeds or to execute even more conservative trajectories than those limited speeds and trajectories as already imposed by the engineering problem. As such, the speed and efficiency of generalist robots performing tasks in warehouse environments to date have been limited.

In view of the above, the inventors have recognized and appreciated that a highly integrated mobile manipulator robot with system-level mechanical design and holistic control strategies between the manipulator and the mobile base may be associated with certain benefits in warehouse and/or logistics operations. Such an integrated mobile manipulator robot may be able to perform complex and/or dynamic motions that are unable to be achieved by conventional, loosely integrated mobile manipulator systems. As a result, this type of robot may be well suited to perform a variety of different tasks (e.g., within a warehouse environment) with speed, agility, and efficiency.

Example Robot Overview

In this section, an overview of some components of one embodiment of a highly integrated mobile manipulator robot configured to perform a variety of tasks is provided to explain the interactions and interdependencies of various subsystems of the robot. Each of the various subsystems, as well as control strategies for operating the subsystems, are described in further detail in the following sections.

Figure 1B:
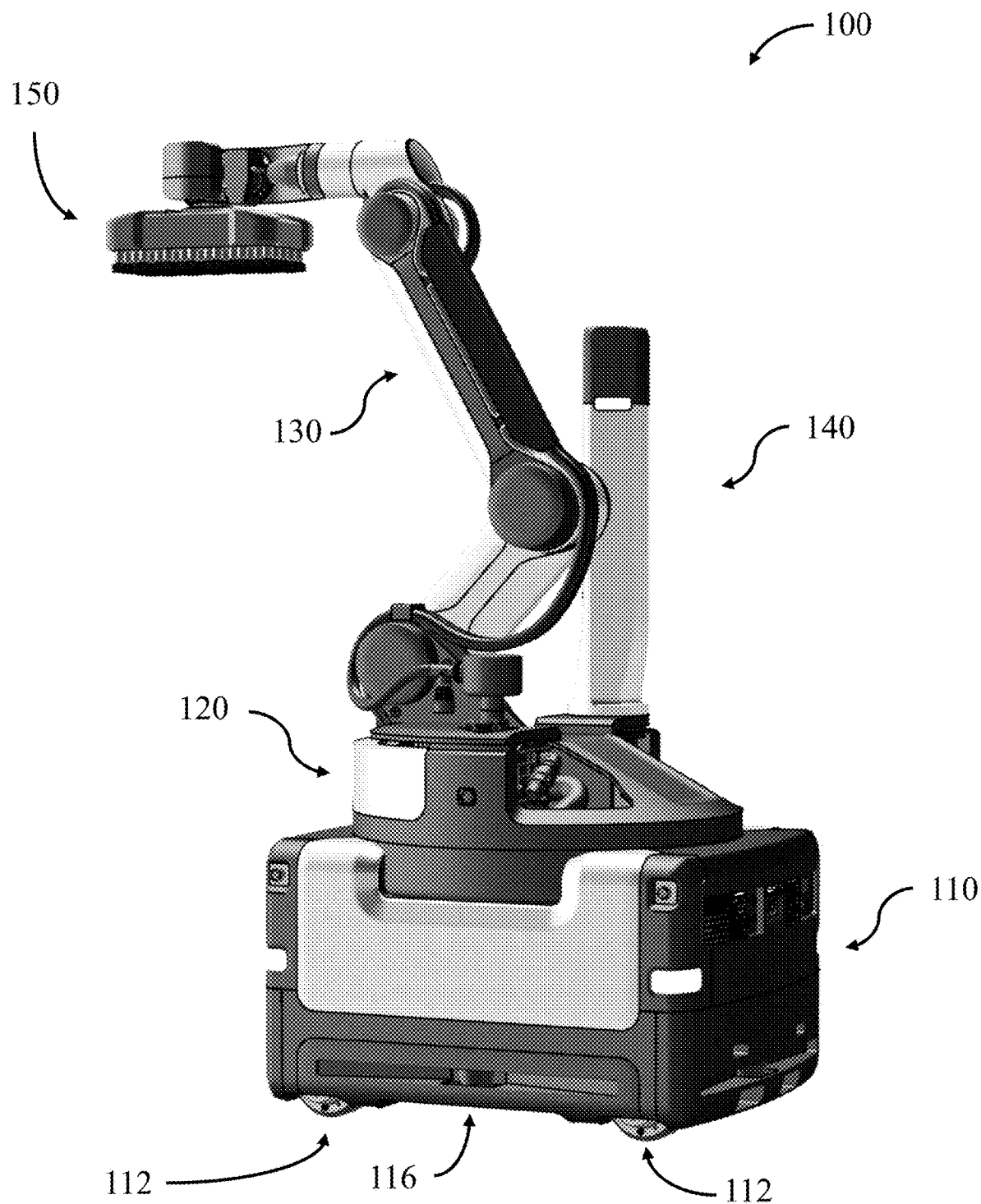
FIG. 1B is another perspective view of the robot of FIG. 1A.

FIGS. 1A and 1B are perspective views of one embodiment of a robot 100. The robot 100 includes a mobile base 110 and a robotic arm 130. The mobile base 110 includes an omnidirectional drive system that enables the mobile base to translate in any direction within a horizontal plane as well as rotate about a vertical axis perpendicular to the plane. Each wheel 112 of the mobile base 110 is independently steerable and independently drivable. The mobile base 110 additionally includes a number of distance sensors 116 that assist the robot 100 in safely moving about its environment. The robotic arm 130 is a 6 degree of freedom (6-DOF) robotic arm including three pitch joints and a 3-DOF wrist. An end effector 150 is disposed at the distal end of the robotic arm 130. The robotic arm 130 is operatively coupled to the mobile base 110 via a turntable 120, which is configured to rotate relative to the mobile base 110. In addition to the robotic arm 130, a perception mast 140 is also coupled to the turntable 120, such that rotation of the turntable 120 relative to the mobile base 110 rotates both the robotic arm 130 and the perception mast 140. The robotic arm 130 is kinematically constrained to avoid collision with the perception mast 140. The perception mast 140 is additionally configured to rotate relative to the turntable 120, and includes a number of perception modules 142 configured to gather information about one or more objects in the robot's environment. The integrated structure and system-level design of the robot 100 enable fast and efficient operation in a number of different applications, some of which are provided below as examples.

Figure 2A:
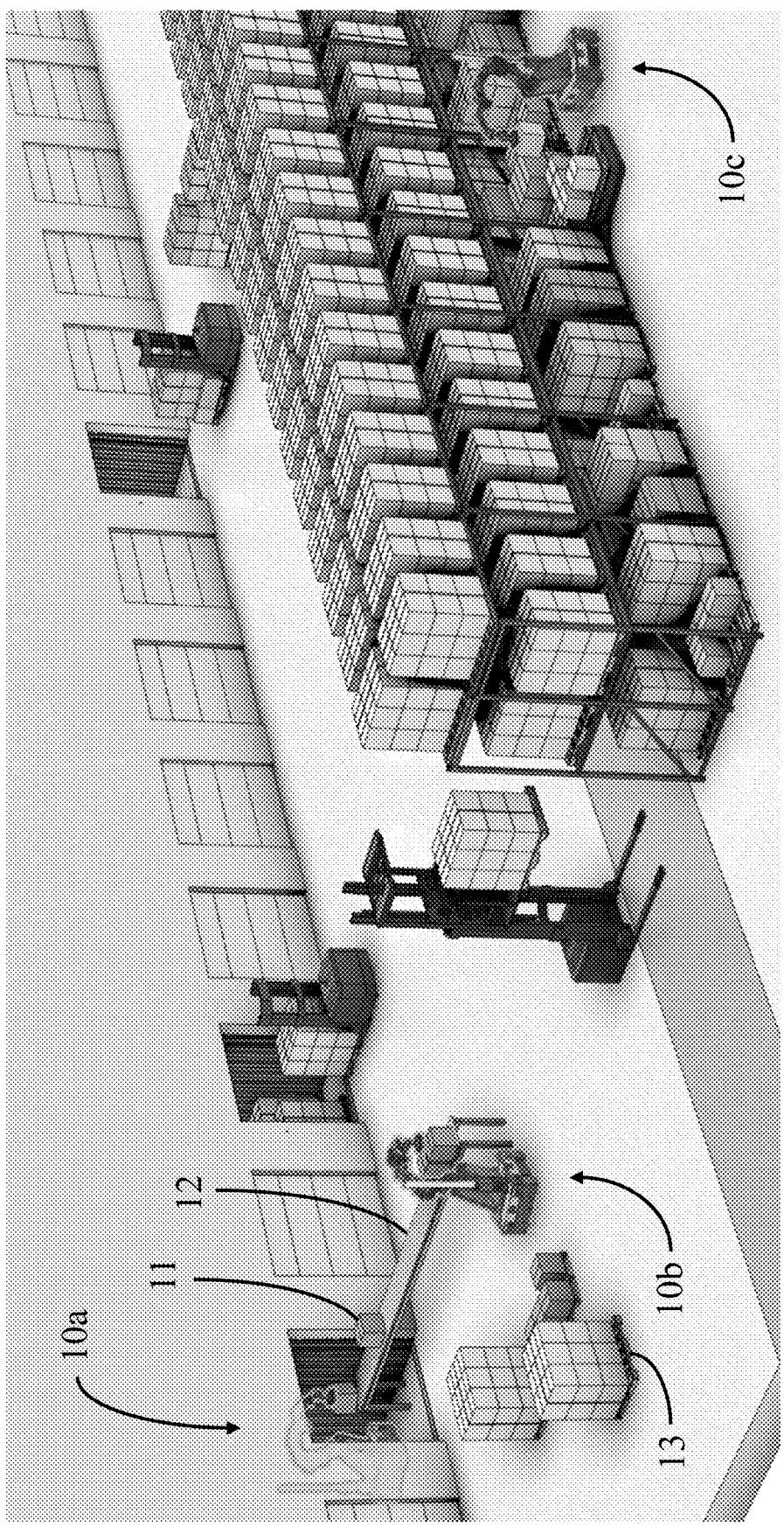
FIG. 2A depicts robots performing tasks in a warehouse environment.

FIG. 2A depicts robots 10a, 10b, and 10c performing different tasks within a warehouse environment. A first robot 10a is inside a truck (or a container), moving boxes 11 from a stack within the truck onto a conveyor belt 12 (this particular task will be discussed in greater detail below in reference to FIG. 2B). At the opposite end of the conveyor belt 12, a second robot 10b organizes the boxes 11 onto a pallet 13. In a separate area of the warehouse, a third robot 10c picks boxes from shelving to build an order on a pallet (this particular task will be discussed in greater detail below in reference to FIG. 2C). It should be appreciated that the robots 10a, 10b, and 10c are different instances of the same robot (or of highly similar robots). Accordingly, the robots described herein may be understood as specialized multipurpose robots, in that they are designed to perform specific tasks accurately and efficiently, but are not limited to only one or a small number of specific tasks.

Figure 2B:
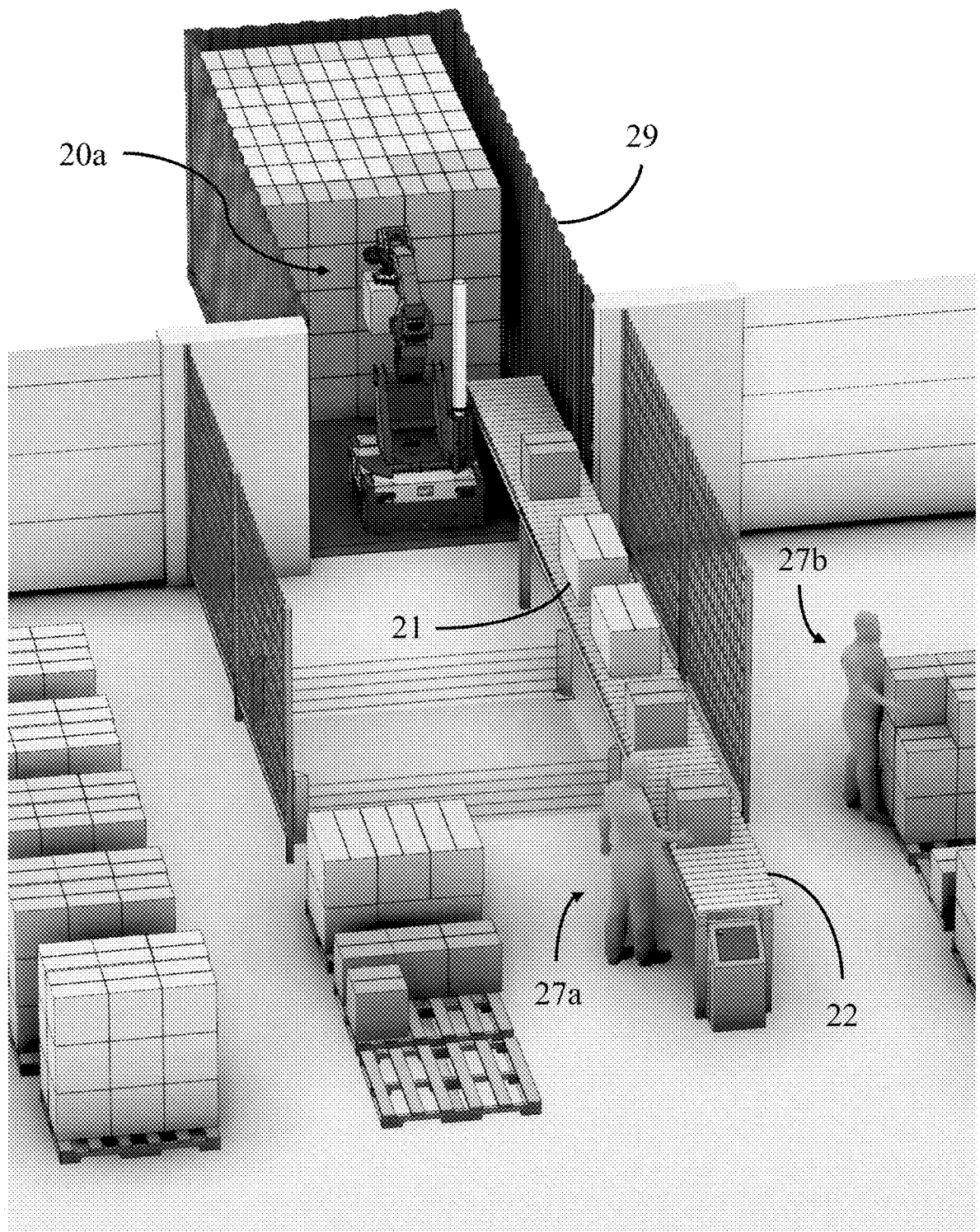
FIG. 2B depicts a robot unloading boxes from a truck.

FIG. 2B depicts a robot 20a unloading boxes 21 from a truck 29 and placing them on a conveyor belt 22. In this box picking application (as well as in other box picking applications), the robot 20a will repetitiously pick a box, rotate, place the box, and rotate back to pick the next box. Although robot 20a of FIG. 2B is a different embodiment from robot 100 of FIGS. 1A and 1B, referring to the components of robot 100 identified in FIGS. 1A and 1B will ease explanation of the operation of the robot 20a in FIG. 2B. During operation, the perception mast of robot 20a (analogous to the perception mast 140 of robot 100 of FIGS. 1A and 1B) may be configured to rotate independent of rotation of the turntable (analogous to the turntable 120) on which it is mounted to enable the perception modules (akin to perception modules 142) mounted on the perception mast to capture images of the environment that enable the robot 20a to plan its next movement while simultaneously executing a current movement. For example, while the robot 20a is picking a first box from the stack of boxes in the truck 29, the perception modules on the perception mast may point at and gather information about the location where the first box is to be placed (e.g., the conveyor belt 22). Then, after the turntable rotates and while the robot 20a is placing the first box on the conveyor belt, the perception mast may rotate (relative to the turntable) such that the perception modules on the perception mast point at the stack of boxes and gather information about the stack of boxes, which is used to determine the second box to be picked. As the turntable rotates back to allow the robot to pick the second box, the perception mast may gather updated information about the area surrounding the conveyor belt. In this way, the robot 20a may parallelize tasks which may otherwise have been performed sequentially, thus enabling faster and more efficient operation.

Also of note in FIG. 2B is that the robot 20a is working alongside humans (e.g., workers 27a and 27b). Given that the robot 20a is configured to perform many tasks that have traditionally been performed by humans, the robot 20a is designed to have a small footprint, both to enable access to areas designed to be accessed by humans, and to minimize the size of a safety zone around the robot into which humans are prevented from entering.

Figure 2C:
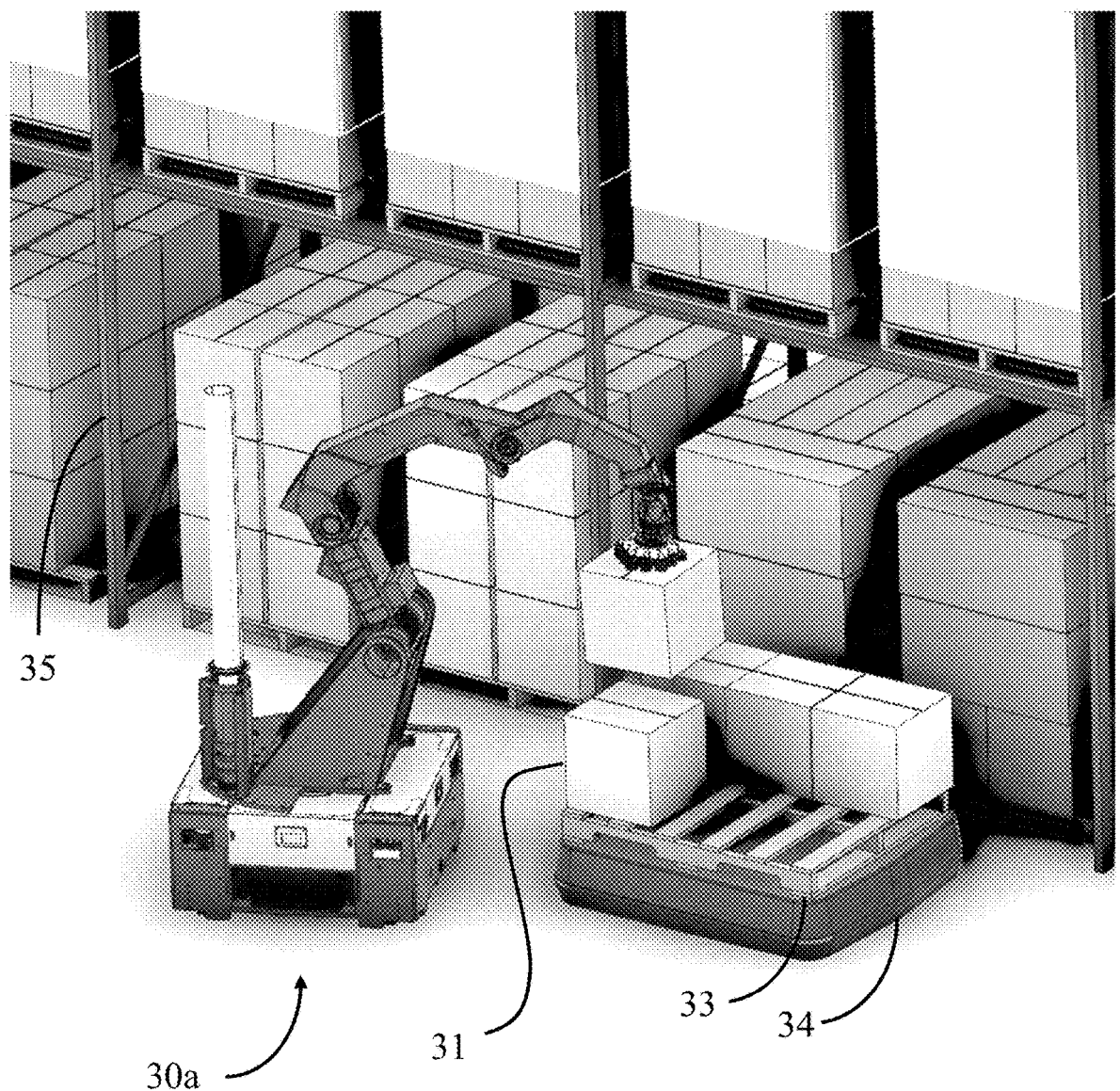
FIG. 2C depicts a robot building a pallet in a warehouse aisle.

FIG. 2C depicts a robot 30a performing an order building task, in which the robot 30a places boxes 31 onto a pallet 33. In FIG. 2C, the pallet 33 is disposed on top of an autonomous mobile robot (AMR) 34, but it should be appreciated that the capabilities of the robot 30a described in this example apply to building pallets not associated with an AMR. In this task, the robot 30a picks boxes 31 disposed above, below, or within shelving 35 of the warehouse and places the boxes on the pallet 33. Certain box positions and orientations relative to the shelving may suggest different box picking strategies. For example, a box located on a low shelf may simply be picked by the robot by grasping a top surface of the box with the end effector of the robotic arm (thereby executing a "top pick"). However, if the box to be picked is on top of a stack of boxes, and there is limited clearance between the top of the box and the bottom of a horizontal divider of the shelving, the robot may opt to pick the box by grasping a side surface (thereby executing a "face pick").

To pick some boxes within a constrained environment, the robot may need to carefully adjust the orientation of its arm to avoid contacting other boxes or the surrounding shelving. For example, in a typical "keyhole problem", the robot may only be able to access a target box by navigating its arm through a small space or confined area (akin to a keyhole) defined by other boxes or the surrounding shelving. In such scenarios, coordination between the mobile base and the arm of the robot may be beneficial. For instance, being able to translate the base in any direction allows the robot to position itself as close as possible to the shelving, effectively extending the length of its arm (compared to conventional robots without omnidirectional drive which may be unable to navigate arbitrarily close to the shelving). Additionally, being able to translate the base backwards allows the robot to withdraw its arm from the shelving after picking the box without having to adjust joint angles (or minimizing the degree to which joint angles are adjusted), thereby enabling a simple solution to many keyhole problems.

Of course, it should be appreciated that the tasks depicted in FIGS. 2A-2C are but a few examples of applications in which an integrated mobile manipulator robot may be used, and the present disclosure is not limited to robots configured to perform only these specific tasks. For example, the robots described herein may be suited to perform tasks including, but not limited to, removing objects from a truck or container, placing objects on a conveyor belt, removing objects from a conveyor belt, organizing objects into a stack, organizing objects on a pallet, placing objects on a shelf, organizing objects on a shelf, removing objects from a shelf, picking objects from the top (e.g., performing a "top pick"), picking objects from a side (e.g., performing a "face pick"), coordinating with other mobile manipulator robots, coordinating with other warehouse robots (e.g., coordinating with AMRs), coordinating with humans, and many other tasks.

Example Gripper and Grasping Strategy

As described above, a robot may include a robotic arm with an end effector (e.g., end effector 150 of robot 100 depicted in FIGS. 1A-1B). In some embodiments, an end effector may include a vacuum-based gripper, which may include multiple vacuum assemblies. Each vacuum assembly may include a valve and a suction cup. Activating the vacuum assembly may include controlling the valve to supply vacuum pressure (e.g., from a vacuum source onboard the robot) to the suction cup, thereby applying a suction force through the suction cup that allows the vacuum assembly to attach to an object. A vacuum assembly or a suction cup may be described herein as "open" when the vacuum assembly is activated and vacuum pressure is supplied to the suction cup.

Generally, it should be appreciated that the present disclosure is not limited in regard to the material, structure, geometry, uniformity, and/or arrangement of the vacuum assemblies and/or suction cups of a vacuum-based gripper. For example, the vacuum assemblies may be arranged in an array and/or coupled to a manifold. In some embodiments, the vacuum assemblies of the robotic gripper may be arranged in a pattern such as a rectilinear grid pattern, a hexagonal grid pattern, or any other suitable pattern. In some embodiments, the vacuum assemblies of the robotic gripper may be arranged in a hybrid array pattern, that may, for example, include a first portion with a rectilinear array and a second portion with a hexagonal array. In some embodiments, the vacuum assemblies of the robotic gripper may be arranged in a non-regular and/or non-patterned layout. Furthermore, it should be appreciated that the vacuum assemblies of a robotic gripper may be uniform (e.g., have the same cross-sectional area, shape and/or material), or a robotic gripper may include a variety of different vacuum assemblies (e.g., having different cross-sectional areas, shapes, and/or materials). Vacuum assemblies may be distinguished, in some embodiments, based on characteristics of the suction cups. For example, different vacuum assemblies may employ suction cups of different sizes or different materials. The grasping strategies disclosed herein are generally agnostic to the material, structure, geometry, uniformity, and/or arrangement of the vacuum assemblies and/or suction cups of a vacuum-based gripper, and any particulars described are for the purpose of example only.

Without wishing to be bound by theory, the quality of a grasp between a vacuum-based gripper and an object may be improved if vacuum assemblies that have a good seal between the gripper and the object are provided with more vacuum and vacuum assemblies that have a poor seal between the gripper and the object are provided with less (or no) vacuum. By deactivating (e.g., closing) vacuum assemblies with poor seals, the pressure of the shared vacuum supply may be maintained, thereby preserving higher pressure for the vacuum assemblies with good seals. If vacuum assemblies with poor seals remain activated (e.g., are left open), the pressure of the vacuum supply may decrease. Generally, the pressure of the vacuum supply may decrease more when a greater number of vacuum assemblies with poor seals are activated. Accordingly, deactivating vacuum assemblies with a poor seal may enable a higher vacuum supply pressure.

Accordingly, there may be certain benefits to deactivating (or "closing") vacuum assemblies that are determined to have a poor seal. To grasp an object, a vacuum-based gripper may first bring a desired number of vacuum assemblies into contact with (or near) a surface of the object. The vacuum assemblies may be activated, and some of the vacuum assemblies may form a seal with the surface. The quality of the seal of each vacuum assembly may be investigated, and vacuum assemblies that are determined to have a poor seal (or no seal) may be deactivated.

Although the above grasping strategy may enable high quality grasps in many scenarios, certain limitations may arise in some situations. In the above grasping strategy, once a vacuum assembly is deactivated, it remains deactivated. However, certain transient processes may occur such that a vacuum assembly that might form a poor seal (or no seal) at one point in time may be able to achieve a good seal at a later point in time. For example, when grasping an object with a deformable surface (e.g., cardboard boxes, shrink-wrapped goods), the surface of the object may be altered as the gripper engages with the surface. As another example, when grasping an object with a non-uniform or irregular surface (e.g., a surface that is not flat), some vacuum assemblies may contact a portion of the surface prior to other vacuum assemblies contacting a different portion of the surface. As a further example, a gripper may approach an object (with a flat surface or otherwise) from an angle, such that some vacuum assemblies contact the surface before other vacuum assemblies.

Depending on the relative timescales of various processes (e.g., gripper and/or object inertial dynamics, pressure dynamics within a suction cup, controller settling times, vacuum assembly deactivation times), a vacuum assembly may be deactivated before it is able to achieve a good seal with the surface. As such, vacuum assemblies that may have been able to achieve a good seal with the surface may nevertheless remain deactivated, resulting in a grasp with a smaller number of vacuum assemblies. Engaging an object with a smaller number of vacuum assemblies may produce an overall lower quality grasp and a limited lifting capacity.

In view of the above, the inventors have recognized and appreciated that grasp quality may be improved by sequentially activating and/or deactivating one or more vacuum assemblies of a vacuum-based robotic gripper. Such a process may enable a vacuum assembly that had previously been deactivated (e.g., after having been determined to have made a poor seal) to be reactivated and potentially form a good seal, enhancing the overall grasp quality. As described above, this approach may be particularly well-suited for grasping objects with deformable surfaces. This approach may be appropriate for grasping objects with complicated yet deformable topology, assisting with misaligned grasps, and exerting small forces on objects. The inventors have considered multiple scenarios in which such a grasping strategy may be particularly well-suited, two examples of which are described below. Of course, such a grasping strategy may be widely applicable to numerous scenarios, and the below examples are not to be construed as limiting.

In a first scenario, a vacuum-based gripper may first bring a desired number of vacuum assemblies into contact with (or near) a surface of an object to be grasped, and the vacuum assemblies may be activated. Due to, for example, the geometry of the surface, only some of the vacuum assemblies may form a good seal with the surface. The remaining vacuum assemblies may form a poor seal or no seal, and may be deactivated. However, as the vacuum assemblies with good seals engage the surface, the surface may be deformed (or the entire object may be displaced) in manner that would enable the deactivated vacuum assemblies to achieve a good seal. For example, the surface may be deformed to reduce the distance between the surface and at least some of the deactivated vacuum assemblies. When the deactivated vacuum assemblies are then reactivated, the surface may be altered such that some or all of the reactivated vacuum assemblies may now form a good seal with the surface. Of course, for any of the reactivated vacuum assemblies that do not form a good seal during this second attempt, the process may be repeated. In this way, sequential activation and deactivation of vacuum assemblies may draw a surface of an object to be grasped into the gripper.

In a second scenario, an impedance-controlled vacuum-based gripper may make light contact with a fragile and/or poorly supported object (e.g., a box at the top of a stack of boxes). The vacuum-based gripper may first bring a subset of a desired number of vacuum assemblies into contact with (or near) a surface of an object to be grasped, and the vacuum assemblies may be activated. Using the above-described grasping strategy of sequential activation and deactivation of vacuum assemblies in parallel with an impedance controller, the gripper may be drawn toward a surface of an object to be grasped.

FIGS. 3A-3D illustrate schematic side views of a vacuum-based robotic gripper 300 engaging with an object 310. The gripper 300 includes a first vacuum assembly 302a, a second vacuum assembly 302b, a third vacuum assembly 302c, a fourth vacuum assembly 302d, and a fifth vacuum assembly 302e. The vacuum assemblies may be individually activatable in some embodiments, such that each vacuum assembly may be activated or deactivated independent of any other vacuum assembly. The object 310 includes a surface 312.

Figure 3A:
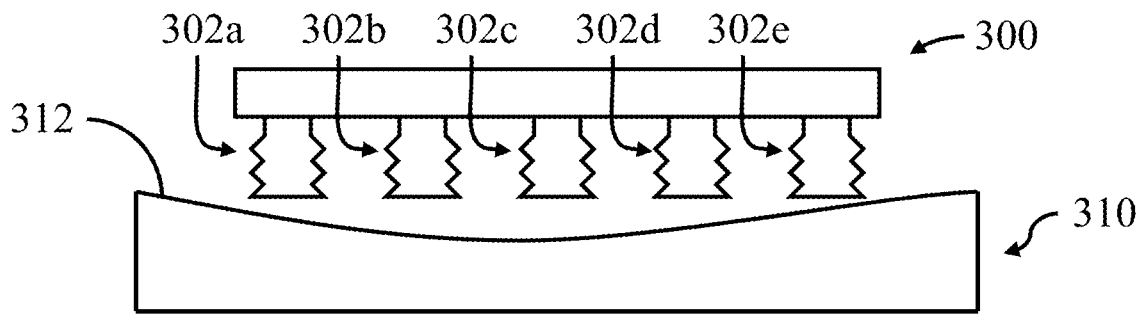
FIG. 3A depicts a robotic gripper prior to engaging an object.

Initially, the surface 312 may be in a configuration such that the vacuum assemblies 302a-302e may not engage with the surface 312 uniformly. As can be seen in FIG. 3A, the surface 312 is curved such that, if the gripper 300 moves toward the surface 312, the vacuum assemblies on the sides of the gripper 300 (e.g., vacuum assemblies 302a and 302e) would contact the surface 312 before the vacuum assemblies in the middle of the gripper 300 (e.g., vacuum assemblies 302b-302d). Of course, it should be appreciated that the particular geometry of the surface 312 of the object 310 depicted in FIGS. 3A-3D is merely an example, and that the grasping strategies described in the present disclosure are not limited to curved surfaces. In some embodiments, they may also cover surfaces with surface imperfections, regular or irregular topological variations, variations in coefficients of friction, multiple surface wrapping materials, etc.

Figure 3B:
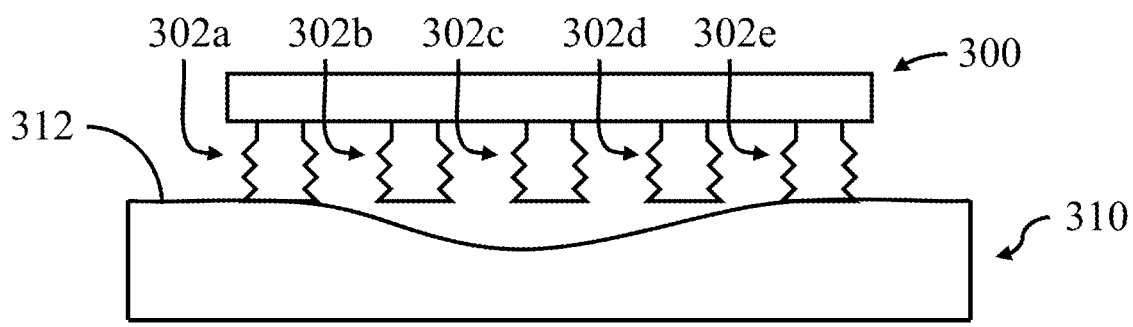
FIG. 3B depicts the robotic gripper of FIG. 3A partially engaging the object.

When the vacuum assemblies 302a-302e are activated, the vacuum assemblies that are closer to the surface 312 may seal against the surface 312, while the vacuum assemblies that are farther from the surface 312 may not seal against the surface 312. FIG. 3B depicts the side vacuum assemblies 302a and 302e sealing to the surface 312 while the middle vacuum assemblies 302b-302d do not seal to the surface 312. As such, the middle vacuum assemblies 302b-302d may be deactivated. Importantly, when vacuum assemblies 302a and 302e seal to the surface 312, the surface 312 is deformed. In particular, the surface 312 is deformed such that the distance between the surface 312 and at least one of the deactivated vacuum assemblies is reduced. With the distance between the surface 312 and a vacuum assembly reduced, that vacuum assembly may now be able to form a seal with the surface 312 upon reactivation.

Figure 3C:
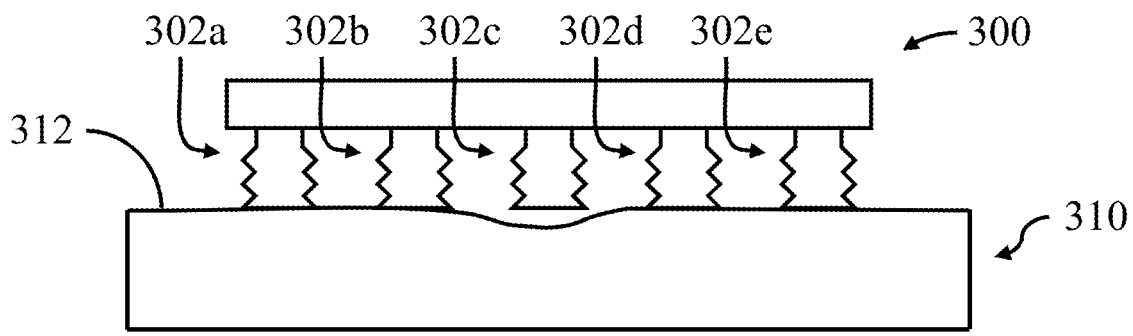
FIG. 3C depicts the robotic gripper of FIG. 3B more fully engaging the object.
Figure 3D:
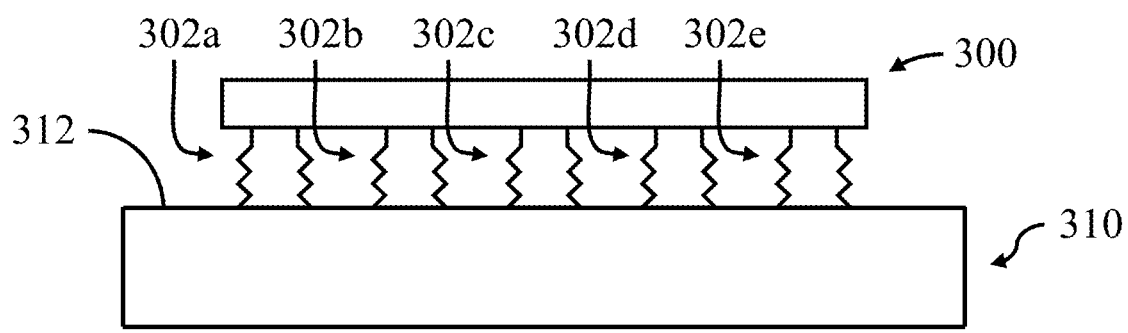
FIG. 3D depicts the robotic gripper of FIG. 3C fully engaging the object.

For example, after vacuum assemblies 302a and 302e seal to the surface 312 in FIG. 3B (and the remaining vacuum assemblies 302b-302d are deactivated), the distance between the surface 312 and next farthest-out vacuum assemblies (e.g., vacuum assemblies 302b and 302d) is reduced such that those vacuum assemblies may then seal against the surface 312 when reactivated, as in FIG. 3C (however, the central vacuum assembly 302c may still be too far from the surface 312, and may again be deactivated). Then, after vacuum assemblies 302b and 302d seal to the surface 312 in FIG. 3C, the distance between the surface 312 and last remaining vacuum assembly 302c is reduced such that the final vacuum assembly 302c may then seal against the surface 312 when reactivated, as in FIG. 3D. In this way, alternatingly activating and/or deactivating one or more of the vacuum assemblies 302a-302e may help to engage a greater number of vacuum assemblies with the object 310, thereby providing a grasp of object 310 over a wider surface area. It should be appreciated that vacuum assemblies may be deactivated passively (e.g., using a flapper valve) or actively (e.g., using a valve controlled based on a sensed pressure level), as the present disclosure is not limited in this regard.

In some embodiments, a vacuum assembly may be deformable. For example, a vacuum assembly may include a bellows structure that allows the vacuum assembly to compress (e.g., along a length of the vacuum bellows, aligned with a direction of suction force). Partially deforming one or more vacuum assemblies of a gripper may advantageously bring other vacuum assemblies closer to (or into contact with) the surface to be grasped. Referring, for example, to FIG. 3B, after vacuum assemblies 302a and 302e seal to the surface 312, vacuum assemblies 302a and 302e may compress along the length. In this way, the surface 312 is drawn toward the remaining vacuum assemblies due in part to the deformation of the surface from the seal of vacuum assemblies 302a and 302e, and due in part to the compression of vacuum assemblies 302a and 302e. Other grasping scenarios that demonstrate the benefits of compressible vacuum assemblies are described below in reference to FIGS. 6A-7C.

Figure 4:
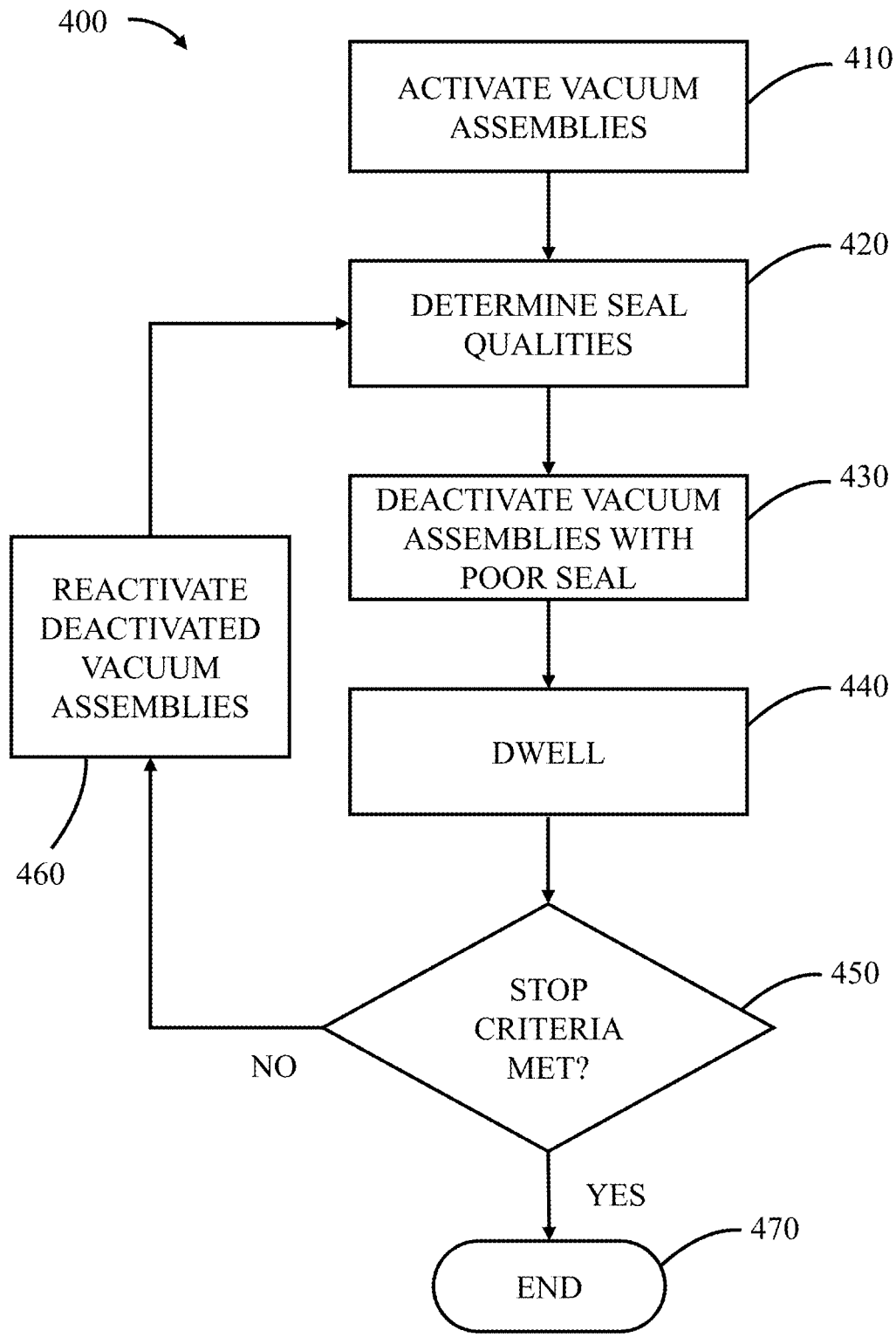
FIG. 4 is a flowchart of a process for controlling a robotic gripper in accordance with some embodiments.

FIG. 4 illustrates a process 400 of controlling a vacuum-based robotic gripper in accordance with some embodiments. In act 410, a plurality of vacuum assemblies of a robotic gripper are activated. As described above, vacuum assemblies may be activated by supplying vacuum to the vacuum assemblies, such as by opening a valve that couples a suction cup of a vacuum assembly to a vacuum source. Process 400 then proceeds to act 420 where a seal quality is determined for each of the activated vacuum assemblies. In some embodiments, a seal quality may be based on a pressure associated with the vacuum assembly (e.g., as determined by a pressure sensor associated with the vacuum assembly), such as a pressure level being below a threshold level. In some embodiments, a threshold level may be an absolute or gauge pressure. For example, a threshold level may be greater than or equal to 0.2 atmosphere and less than or equal to 0.6 atmosphere, or a threshold level may be greater than or equal to 0.3 atmosphere and less than or equal to 0.5 atmosphere. In some embodiments, a threshold level may be based, at least in part, on a pressure of a vacuum source. For example, a threshold level may be greater than or equal to 20% of a vacuum source pressure and less than or equal to 99% of the vacuum source pressure, or a threshold level may be greater than or equal to 60% of the vacuum source pressure and less than or equal to 98% of the vacuum source pressure. Process 400 then proceeds to act 430 where one or more of the activated vacuum assemblies is deactivated based, at least in part, on the determined seal quality. For example, those vacuum assemblies that were determined to have a poor seal may be deactivated to enable the remaining vacuum assemblies to increase their respective seal quality. It should be appreciated that if all vacuum assemblies were determined in act 420 to have a good seal, no vacuum assemblies may be deactivated in act 430.

Acts 410, 420 and 430 may be performed with any suitable relative timing. For instance, in some embodiments, activation of vacuum assemblies in act 410 and subsequent determination of seal quality for each of the activated vacuum assemblies in act 420 is achieved by applying a brief seal detection "pulse" of (e.g., non-steady state) pressure to each of the vacuum assemblies and measuring the amplitude of the pressure within each of the vacuum assemblies in response to the seal detection pulse. Vacuum assemblies associated with pressures below a threshold level may be determined to have a poor seal and may be deactivated in act 430, as described above. In other embodiments, activation of vacuum assemblies in act 410 and subsequent determination of seal quality for each of the activated vacuum assemblies in act 420 is achieved by applying a steady state pressure to each of the vacuum assemblies and measuring the steady state pressure within each of the vacuum assemblies after a particular amount of time (e.g., 1 ms, 5, ms, 10 ms, 100 ms, 500 ms,) has elapsed. Vacuum assemblies associated with steady-state pressures below a threshold level may be determined to have a poor seal and may be deactivated in act 430, as described above.

Process 400 then proceeds to act 440 at which a dwell time is observed. A dwell time may enable certain transient dynamics to settle. For example, a dwell time may provide sufficient time for the surface of an object, portions of a vacuum assembly, other portions of a robot body, or a controller to settle. In some embodiments, a dwell time may be greater than or equal to 5 milliseconds (ms), 10 ms, 25 ms, 50 ms, 100 ms, 250 ms, 500 ms, 1000 ms, or 2500 ms. In some embodiments, a dwell time may be less than or equal to 5000 ms, 2500 ms, 1000 ms, 500 ms, 250 ms, 100 ms, 50 ms, 25 ms, or 10 ms. It should be appreciated that combinations of the above ranges are also contemplated. For example, a dwell time may be greater than or equal to 5 ms and less than or equal to 5000 ms. Alternatively, a dwell time may be greater than or equal to 50 ms and less than or equal to 1000 ms, or greater than or equal to 100 ms and less than or equal to 500 ms. Of course, other dwell times may be appropriate, and the present disclosure is not limited in this regard.

Process 400 then proceeds to act 450 where it is determined if one or more stop criteria are met. Stop criteria may include a number of deactivated cups being below a threshold number of cups, a number of activated cups being above threshold number of cups, reaching a threshold number of deactivation/reactivation cycles, and/or exceeding a threshold time limit. In some embodiments, an output of a model may be used, at least in part, to determine stop criteria. For instance, the model may take as input one or more variables associated with the gripper and/or the grasped object and/or one or more predetermined values, and may provide as an output a heuristic that may be used as a stop criterion. Examples of such models include, but are not limited to: a model that includes breakaway force and/or moment of the object under different loading conditions, a model that includes information relating to how many and/or which vacuum assemblies of the gripper are activated and/or deactivated, a model that includes the pressure of the vacuum source (e.g., the vacuum source pressure reaching a level below a threshold level), a model that includes object mass, a model that includes object size, a model that includes object shape, or any other suitable model. Of course, other stop criteria may be appropriate, and the present disclosure is not limited in this regard. If it is determined that sufficient stop criteria are met, process 400 ends at act 470. If it is determined that sufficient stop criteria are not met, process 400 then proceeds to act 460 where at least some of the deactivated vacuum assemblies are reactivated. Process 400 then returns to act 420 where a seal quality is determined for each of the activated vacuum assemblies (in some embodiments, a seal quality may only be determined for the reactivated vacuum assemblies).

It should be appreciated that process 400 may proceed through the depicted loop (e.g., from act 420 to act 460, and back to act 420) any suitable number of times until one or more stop criteria are met at act 450. Additionally, it should be appreciated that with each iteration of the loop, the number of deactivated vacuum assemblies may either remain the same or decrease. With each iteration of the loop, the number of deactivated vacuum assemblies may not increase, because those vacuum assemblies with good seals remain activated while only those vacuum assemblies with poor seals are deactivated (and subsequently reactivated). In this way, the number of vacuum assemblies with a good seal, and thus the overall grasp quality, may increase with each iteration of the loop.

In some embodiments, a status of one or more vacuum assemblies (e.g., a status of the deactivated vacuum assemblies, or a status of all vacuum assemblies) may be monitored throughout the duration of a grasp. For example, process 400 may proceed as described above in reference to FIG. 4, but there may be no explicit stop criteria, and thus no finite dwell time. For example, the gripper may make an initial grasp of the object (which may include one or more iterations of activating and/or deactivating one or more vacuum assemblies), and then may begin to move the object. As the object is moved, certain characteristics of the object and/or surface may change (e.g., contents within the box may shift, altering the surface geometry), thereby altering parameters associated with the grasp. In response, one or more vacuum assemblies may be activated and/or deactivated in accordance with the processes described herein to regrasp the object. For example, a vacuum assembly with a formerly good seal may be unable to maintain a good seal and may be deactivated, or a vacuum assembly with a formerly poor seal may be able to achieve a good seal. Accordingly, in some embodiments, a method of grasping an object may not include an explicit dwell time and/or any explicit stop criteria. In some embodiments, a dwell time may be associated with the entire duration of a grasp, and the stop criteria may include intentionally releasing the grasped object from the gripper after delivering it to its target location.

Figure 5:
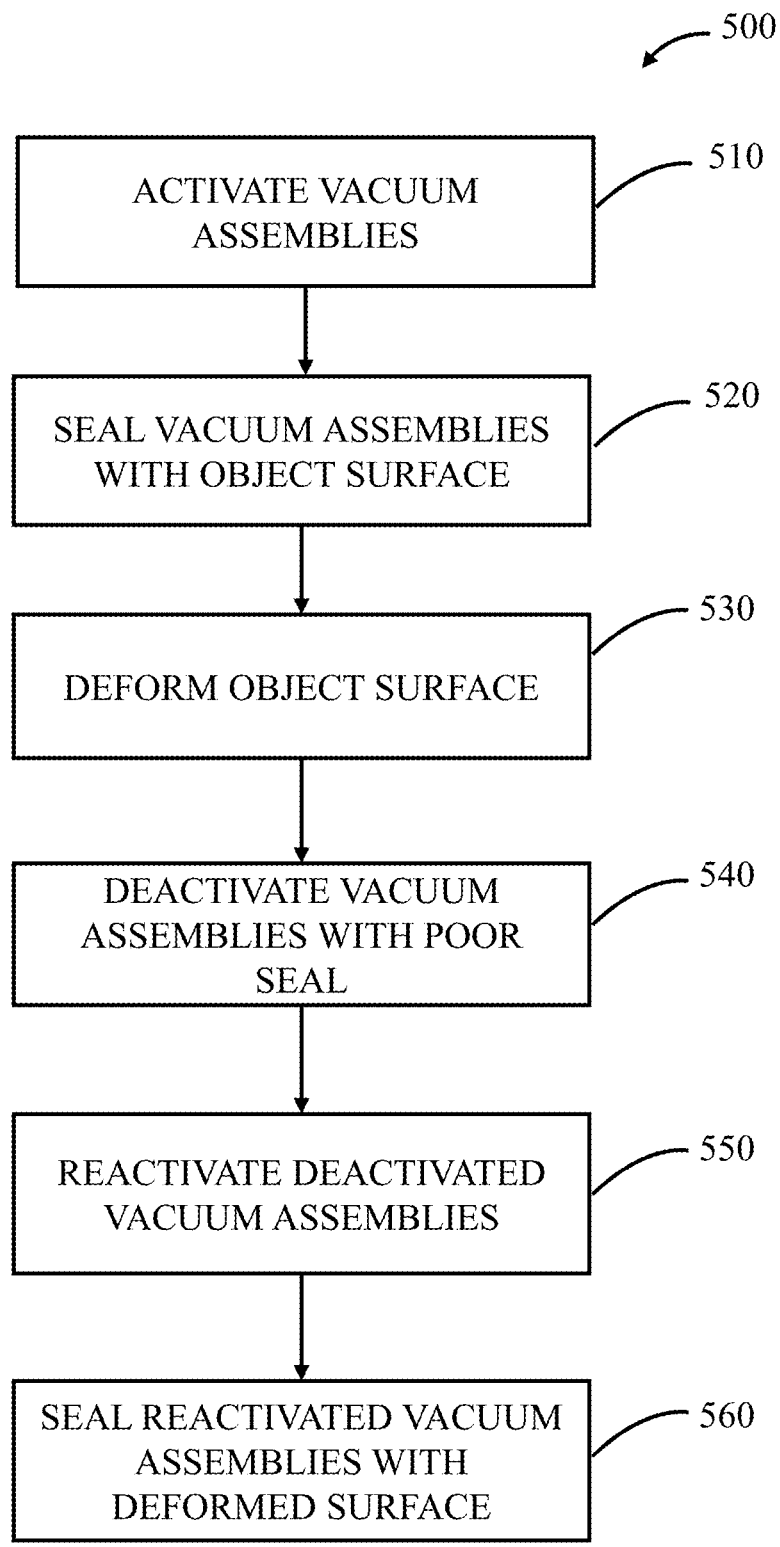
FIG. 5 is a flowchart of a process for grasping an object in accordance with some embodiments.

FIG. 5 illustrates a process 500 of grasping an object in accordance with some embodiments. In act 510, a plurality of vacuum assemblies of a robotic gripper are activated. Process 500 then proceeds to act 520 where at least one of the activated vacuum assemblies is sealed with a surface of an object. Process 500 then proceeds to act 530 where the surface of the object is deformed. For example, the surface of the object may deform in response to the vacuum assemblies sealing with the surface in act 520. Process 500 then proceeds to act 540 where one or more vacuum assemblies is deactivated. For example, vacuum assemblies with a poor seal (or no seal) may be deactivated. A poor seal may be detected based on a pressure level of the vacuum assembly, which may be determined using an associated pressure sensor. In some embodiments, the object surface may not be fully deformed (or may not have begun deforming) before vacuum assemblies with a poor seal are deactivated at act 540. Accordingly, it should be appreciated that acts 530 and 540 may occur contemporaneously or that act 540 may occur before act 530 in some embodiments. Process 500 then proceeds to act 550 where at least one of the deactivated vacuum assemblies is reactivated. As described above, the deactivated vacuum assemblies may be reactivated after a dwell time is observed. Process 500 then proceeds to act 560 where at least one of the reactivated vacuum assemblies is sealed with the deformed surface of the object.

Figure 6A:
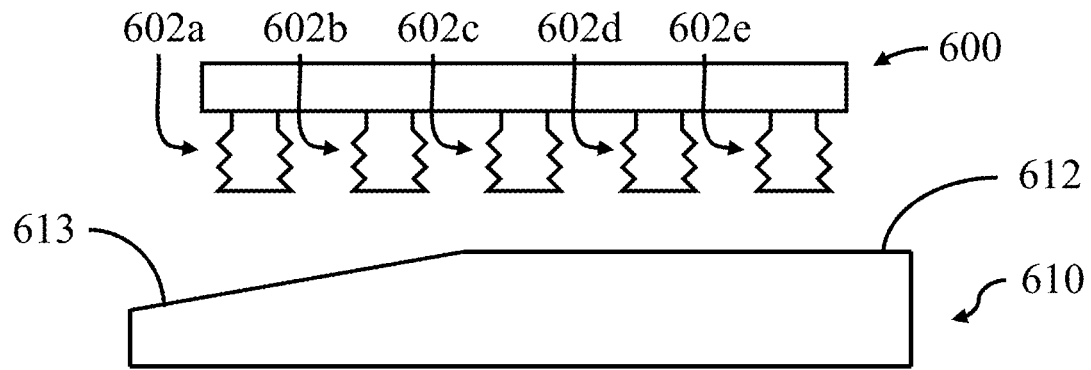
FIG. 6A depicts a robotic gripper prior to engaging an object with a partially angled surface.
Figure 6B:
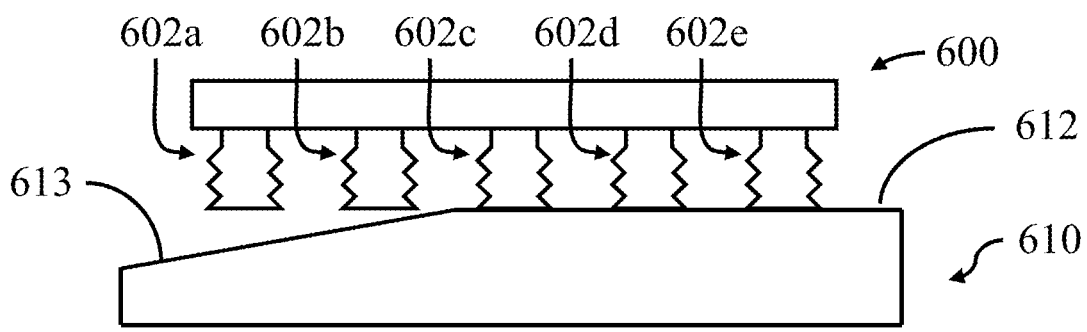
FIG. 6B depicts the robotic gripper of FIG. 6A partially engaging the object.
Figure 6C:
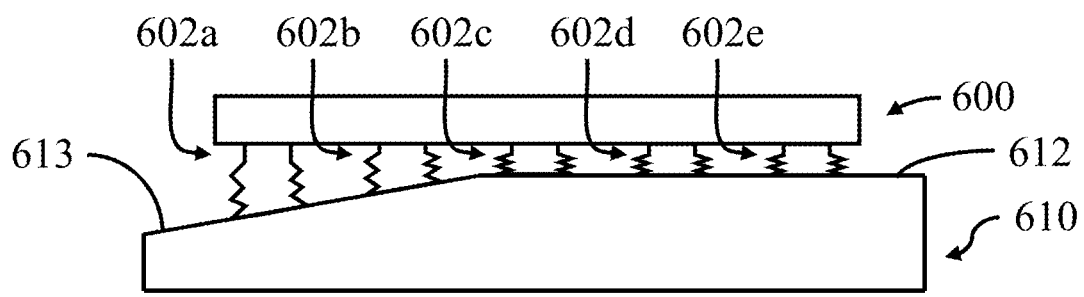
FIG. 6C depicts the robotic gripper of FIG. 6B fully engaging the object.

FIGS. 6A-6C depict a robotic gripper 600 engaging an object 610 with a partially angled surface. Specifically, object 610 includes a surface with a flat portion 612 (e.g., flat relative to an orientation of the gripper 600) and an angled portion 613 (e.g., angled relative to the orientation of the gripper 600). In FIG. 6A, the gripper 600 is spaced from the surface of the object 610. As the distance between the gripper 600 and the object 610 is reduced (e.g., as the gripper is lowered relative to the object), initial contact is made, as shown in FIG. 6B. As the gripper 600 makes contact with the flat portion 612 of the surface, vacuum assemblies 602*c*, 602*d*, and 602*e* are able to form a good seal with the surface. However, vacuum assemblies 602*a* and 602*b* are too far from the angled portion 613 of the surface to be able to form a good seal with the surface. In FIG. 6C, the distance between the gripper 600 and the object 610 is further reduced. The distance between the gripper and the object may be reduced due to motion of the gripper towards the object (e.g., due to motion of the arm to which the gripper is attached), motion of the object toward the gripper (e.g., due to one or more vacuum assemblies pulling the object toward the gripper), or a combination of these effects. In FIG. 6C, the vacuum assemblies that have already engaged the surface (e.g., vacuum assemblies 602*c*, 602*d*, and 602*e*) are compressed. Vacuum assemblies 602*a* and 602*b* have moved sufficiently close to the angled portion 613 of the surface to establish a good seal. Given the relative angle between the surface of the object 610 and the vacuum assemblies 602*a* and 602*b*, vacuum assemblies 602*a* and 602b may be asymmetrically deformed (e.g., one portion of a vacuum assembly may be compressed more than another portion, or one portion may be compressed while another portion is expanded).

Figure 7A:
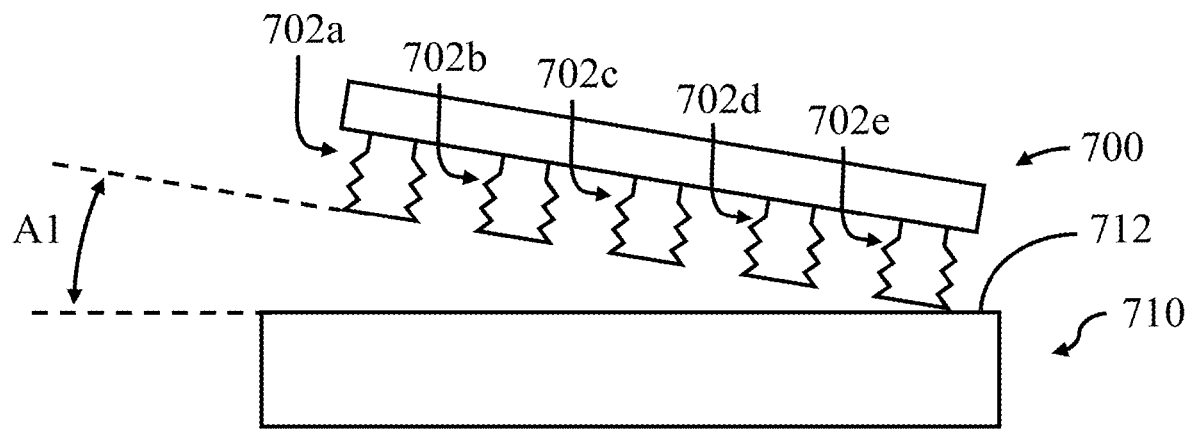
FIG. 7A depicts a robotic gripper approaching an object from an angle.
Figure 7B:
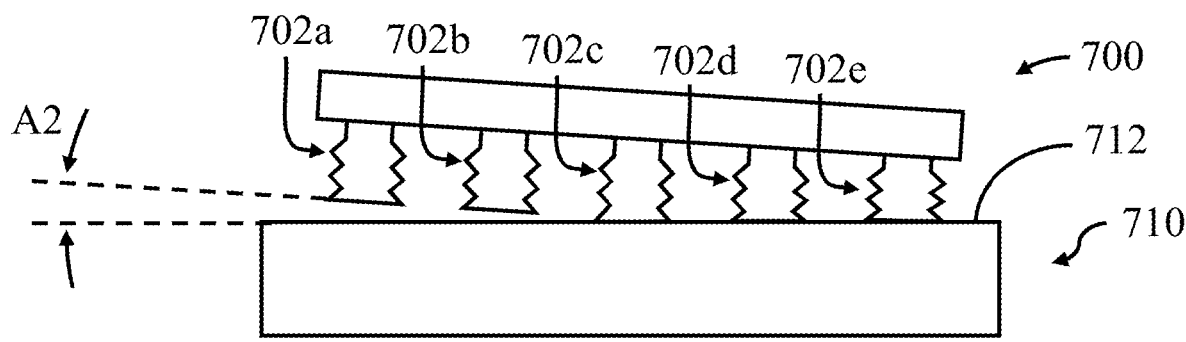
FIG. 7B depicts the robotic gripper of FIG. 7A partially engaging the object.
Figure 7C:
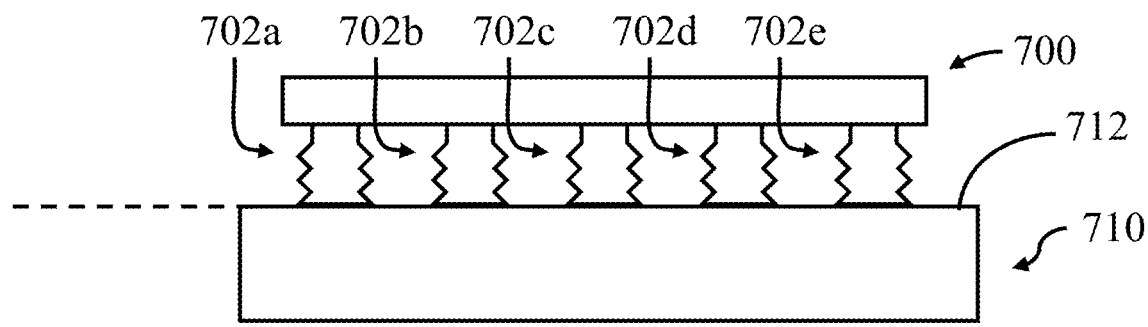
FIG. 7C depicts the robotic gripper of FIG. 7B fully engaging the object.

FIGS. 7A-7C depict a robotic gripper 700 approaching an object 710 from an angle. For example, the bottoms of the vacuum assemblies of the gripper (e.g., vacuum assemblies 702a, 702b, 702c, 702d, and 702e) may be aligned, and a line connecting the bottoms of the vacuum assemblies may be angled relative to a surface 712 of the object by angle A1, as shown in FIG. 7A. As vacuum assembly 702e engages the surface 712 and forms a good seal, the gripper 700 may rotate relative to the object 710 to reduce the relative angle between the gripper and the object and to sequentially engage additional vacuum assemblies. As shown in FIG. 7B, after the relative angle between the gripper 700 and the surface 712 is reduced to a smaller angle A2, additional vacuum assemblies 702c and 702d have engaged with the surface 712. In some embodiments, an impedance controller for the gripper, an arm to which the gripper is mounted, or a robot to which an arm is mounted may determine, at least in part, the motion of the gripper 700. Eventually the gripper 700 may be aligned with the surface 712 of the object 710, and all vacuum assemblies 702a-702e may be able to engage.

It should be appreciated that features of the scenarios depicted in FIGS. 3A-3D and 6A-7C may be encountered in different combinations, and that the structures and methods described herein may be able to accommodate these combinations of features appropriately. For example, a gripper may approach a surface with a curved surface (as shown in FIGS. 3A-3D) from an angle (as shown in FIGS. 7A-7C). Additionally, the structures and methods described herein may be able to accommodate other surface geometries and/or approach trajectories, and the present disclosure is not limited to those explicitly shown in the figures. Furthermore, it should be appreciated that any relative motion between a surface of an object to be grasped and a gripper may be exploited to improve a grasp. For example, deactivated vacuum assemblies may be reactivated after a surface is deformed, after an object is displaced and/or reoriented relative to the gripper, and/or after the gripper is displaced and/or reoriented relative to the object.

Control of one or more of the robotic arm, the mobile base, the turntable, and the perception mast may be accomplished using one or more computing devices located onboard the mobile manipulator robot. For instance, one or more computing devices may be located within a portion of the mobile base with connections extending between the one or more computing devices and components of the robot that provide sensing capabilities and components of the robot to be controlled. In some embodiments, the one or more computing devices may be coupled to dedicated hardware configured to send control signals to particular components of the robot to effectuate operation of the various robot systems. In some embodiments, the mobile manipulator robot may include a dedicated safety-rated computing device configured to integrate with safety systems that ensure safe operation of the robot.

The computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the terms "physical processor" or "computer processor" generally refer to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that embodiments of a robot may include at least one non-transitory computer-readable storage medium (e.g., a computer memory, a portable memory, a compact disk, etc.) encoded with a computer program (i.e., a plurality of instructions), which, when executed on a processor, performs one or more of the above-discussed functions. Those functions, for example, may include control of the robot and/or driving a wheel or arm of the robot. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

What is claimed is:

1. A method comprising:
    activating each of a plurality of vacuum assemblies of a robotic gripper by supplying a vacuum to each vacuum assembly;
    determining, for each of the activated vacuum assemblies, a first respective seal quality of the vacuum assembly with a deformable surface of a first grasped object;
    deactivating one or more of the activated vacuum assemblies based, at least in part, on the first respective seal qualities;
    observing a dwell time for the activated vacuum assemblies to deform the deformable surface of the first grasped object; and
    after observing the dwell time, reactivating one or more of the deactivated vacuum assemblies to attempt to seal with the deformed surface of the first grasped object.

2. The method of claim 1, further comprising:
    determining, for the one or more of the reactivated vacuum assemblies, a second respective seal quality of the vacuum assembly; and
    deactivating one or more of the reactivated vacuum assemblies based, at least in part, on the second respective seal qualities.

3. The method of claim 1, wherein determining, for each of the activated vacuum assemblies, a first respective seal quality of the vacuum assembly comprises sensing, for each one or more of the activated vacuum assemblies, a first respective pressure level of the vacuum assembly.

4. The method of claim 3, wherein deactivating one or more of the activated vacuum assemblies based, at least in part, on the first respective seal qualities comprises deactivating one or more of the activated vacuum assemblies when the first sensed pressure levels are below a threshold level.

5. The method of claim 1, further comprising repeatedly performing the determining, the deactivating, and the reactivating until a stop criterion is satisfied.

6. The method of claim 5, wherein the stop criterion comprises one or more of:
    a number of deactivated cups being below a threshold number of cups,
    reaching a threshold number of deactivation/reactivation cycles, or
    exceeding a threshold time limit.

7. The method of claim 5, wherein the stop criterion is based, at least in part, on an output of a model associated with an interaction between the robotic gripper and the first grasped object.

8. The method of claim 1, wherein
    activating each of the plurality of vacuum assemblies of the robotic gripper comprises supplying a pulse of vacuum to each vacuum assembly,
    determining, for each of the activated vacuum assemblies, a first respective seal quality of the vacuum assembly with a first grasped object comprises determining an amplitude of a pressure signal inside a respective activated vacuum assembly in response to application of the pulse of vacuum, and
    deactivating one or more of the activated vacuum assemblies based, at least in part, on the first respective seal qualities comprises deactivating one or more of the activated vacuum assemblies when the respective amplitude of the pressure signal inside the respective activated vacuum assembly is below a threshold level.

9. The method of claim 1, wherein
    activating each of the plurality of vacuum assemblies of the robotic gripper comprises supplying a steady state vacuum to each vacuum assembly,
    determining, for each of the activated vacuum assemblies, a first respective seal quality of the vacuum assembly with a first grasped object comprises determining a steady state pressure signal inside a respective activated vacuum assembly after the steady state vacuum has been supplied to the respective activated vacuum assembly for a particular amount of time, and
    deactivating one or more of the activated vacuum assemblies based, at least in part, on the first respective seal qualities comprises deactivating a respective activated vacuum assembly when the respective steady state pressure inside the respective activated vacuum assembly is below a threshold level.

10. A mobile robotic device, comprising:
a robotic gripper comprising a plurality of vacuum assemblies and at least one pressure sensor associated with each vacuum assembly of the plurality of vacuum assemblies; and
at least one computer processor programmed to:
  activate each of the plurality of vacuum assemblies by supplying a vacuum to each vacuum assembly;
  determine, for each of the activated vacuum assemblies, a first respective seal quality of the vacuum assembly with a deformable surface of a first grasped object;
  deactivate one or more of the activated vacuum assemblies based, at least in part, on the first respective seal qualities;
  observe a dwell time for the activated vacuum assemblies to deform the deformable surface of the first grasped object; and
  after observing the dwell time, reactivate one or more of the deactivated vacuum assemblies to attempt to seal with the deformed surface of the first grasped object.

11. The mobile robotic device of claim 10, wherein the at least one computer processor is programmed to determine, for each of the activated vacuum assemblies, a first respective seal quality of the vacuum assembly using a first respective pressure level of the vacuum assembly from a respective pressure sensor of the robotic gripper.

12. A method of grasping an object, the method comprising:
  activating a plurality of vacuum assemblies of a robotic gripper;
  sealing at least one of the activated vacuum assemblies with a deformable surface of the object;
  deactivating one or more of the activated vacuum assemblies;
  observing a dwell time for the activated vacuum assemblies to deform the deformable surface of the object;
  after observing the dwell time, reactivating one or more of the deactivated vacuum assemblies to attempt to seal with the deformed surface of the object; and
  sealing at least one of the reactivated vacuum assemblies with the deformed surface of the object.

13. The method of claim 12, wherein deactivating one or more of the activated vacuum assemblies comprises deactivating one or more of the activated vacuum assemblies based, at least in part, on a determined seal quality of the activated vacuum assemblies.

14. The method of claim 13, wherein the determined seal quality of the activated vacuum assemblies is based, at least in part on a pressure level of the vacuum assembly.

15. The method of claim 12, wherein sealing the at least one of the activated vacuum assemblies with the surface of the object deforms the surface.

16. The method of claim 12, wherein sealing the at least one of the activated vacuum assemblies with the surface of the object displaces the object.

17. The method of claim 12, further comprising repositioning the robotic gripper relative to the object prior to reactivating the one or more of the deactivated vacuum assemblies.

18. The method of claim 12, further comprising repeatedly performing the deactivating and the reactivating until a stop criterion is satisfied.

19. The method of claim 18, wherein the stop criterion comprises one or more of:
  a number of deactivated cups being below a threshold number of cups,
  reaching a threshold number of deactivation/reactivation cycles, or
  exceeding a threshold time limit.

20. The method of claim 18, wherein the stop criterion is based, at least in part, on an output of a model associated with an interaction between the robotic gripper and the grasped object.

* * * * *